US012592822B2

(12) United States Patent
Ohno

(10) Patent No.: US 12,592,822 B2
(45) Date of Patent: Mar. 31, 2026

(54) CODE CONVERSION APPARATUS, CODE CONVERSION METHOD, AND COMPUTER READABLE RECORDING MEDIUM

(71) Applicant: NEC Corporation, Tokyo (JP)

(72) Inventor: Yoshiyuki Ohno, Tokyo (JP)

(73) Assignee: NEC CORPORATION, Tokyo (JP)

( * ) Notice: Subject to any disclaimer, the term of this patent is extended or adjusted under 35 U.S.C. 154(b) by 119 days.

(21) Appl. No.: 18/714,700

(22) PCT Filed: Dec. 27, 2021

(86) PCT No.: PCT/JP2021/048647
§ 371 (c)(1),
(2) Date: May 30, 2024

(87) PCT Pub. No.: WO2023/127047
PCT Pub. Date: Jul. 6, 2023

(65) Prior Publication Data
US 2025/0047481 A1     Feb. 6, 2025

(51) Int. Cl.
*H04L 9/14* (2006.01)

(52) U.S. Cl.
CPC ..................................... *H04L 9/14* (2013.01)

(58) Field of Classification Search
CPC ........................................................ H04L 9/14
See application file for complete search history.

(56) References Cited

U.S. PATENT DOCUMENTS 6,775,682 B1 * 8/2004 Ballamkonda .... G06F 16/24556
707/999.102
6,820,266 B1 * 11/2004 Minakawa ............ G06F 16/258
719/313

(Continued)

FOREIGN PATENT DOCUMENTS

JP     2012-504825 A1     2/2012
JP     2014-228974 A1     12/2014

(Continued)

OTHER PUBLICATIONS

English translation of Written opinion for PCT Application No. PCT/JP2021/048647, mailed on Mar. 22, 2022.

(Continued)

*Primary Examiner* — Yonas A Bayou
(74) *Attorney, Agent, or Firm* — Sughrue Mion, PLLC

(57) ABSTRACT

A code conversion apparatus first combines key columns, and detects a first function code for executing a grouping operation for each combined key column, next detects a key column name from the first function code, next generates a group key using the key column name for each two-dimensional array data of the first function code, next detects overlap key column names in the group keys, and generates an overlap group composed of the overlap key column names, next adds a second function code for executing a grouping operation using the overlap group name of the overlap group and the key column names constituting the overlap group, and a third function code for adding the overlap group name to the two-dimensional array data as a key column, and next replaces the key column name used in the overlap group included in the first function code with the overlap group name.

9 Claims, 13 Drawing Sheets

| ROW NUMBER | Category | ... | Target | | Category ID | ... | Target | | Category Tgt-Mean | ... | Target |
|---|---|---|---|---|---|---|---|---|---|---|---|
| 0 | A | ... | 1 | | 1 | ... | 1 | | 0.50 | ... | 1 |
| 1 | A | ... | 0 | | 1 | ... | 0 | | 0.50 | ... | 0 |
| 2 | B | ... | 1 | | 2 | ... | 1 | | 0.33 | ... | 1 |
| 3 | B | ... | 0 | | 2 | ... | 0 | | 0.33 | ... | 0 |
| 4 | B | ... | 0 | | 2 | ... | 0 | | 0.33 | ... | 0 |
| 5 | C | ... | 1 | | 3 | ... | 1 | | 0.75 | ... | 1 |
| 6 | C | ... | 0 | | 3 | ... | 0 | | 0.75 | ... | 0 |
| 7 | C | ... | 1 | | 3 | ... | 1 | | 0.75 | ... | 1 |
| 8 | C | ... | 1 | | 3 | ... | 1 | | 0.75 | ... | 1 |
| 9 | D | ... | 1 | | 4 | ... | 1 | | 1.00 | ... | 1 |

(56)        References Cited

U.S. PATENT DOCUMENTS

| | | | | |
|---|---|---|---|---|
| 2014/0211231 | A1* | 7/2014 | Manabe | G06F 3/1285 |
| | | | | 358/1.13 |
| 2016/0070761 | A1* | 3/2016 | Viel | G06F 16/24568 |
| | | | | 707/713 |
| 2020/0117510 | A1* | 4/2020 | Kondiles | G06F 16/2246 |
| 2020/0167359 | A1* | 5/2020 | Kent, IV | G06F 16/254 |
| 2020/0201860 | A1* | 6/2020 | Vogelsgesang | G06F 16/24537 |
| 2021/0019319 | A1* | 1/2021 | Vogelsgesang | G06F 16/24539 |
| 2023/0342419 | A1* | 10/2023 | Lin | G06F 9/30014 |
| 2024/0031370 | A1* | 1/2024 | Ubach | G05B 19/042 |

FOREIGN PATENT DOCUMENTS

| | | |
|---|---|---|
| WO | 2014/188500 | 11/2014 |
| WO | 2020/131243 | 6/2020 |

OTHER PUBLICATIONS

International Search Report for PCT Application No. PCT/JP2021/048647, mailed on Mar. 22, 2022.

* cited by examiner

| ROW NUMBER | Category | ... | Target |
|---|---|---|---|
| 0 | A | ... | 1 |
| 1 | A | ... | 0 |
| 2 | B | ... | 1 |
| 3 | B | ... | 0 |
| 4 | B | ... | 0 |
| 5 | C | ... | 1 |
| 6 | C | ... | 0 |
| 7 | C | ... | 1 |
| 8 | C | ... | 1 |
| 9 | D | ... | 1 |

2

| Category ID | ... | Target |
|---|---|---|
| 1 | ... | 1 |
| 1 | ... | 0 |
| 2 | ... | 1 |
| 2 | ... | 0 |
| 2 | ... | 0 |
| 3 | ... | 1 |
| 3 | ... | 0 |
| 3 | ... | 1 |
| 3 | ... | 1 |
| 4 | ... | 1 |

3

| Category Tgt-Mean | ... | Target |
|---|---|---|
| 0.50 | ... | 1 |
| 0.50 | ... | 0 |
| 0.33 | ... | 1 |
| 0.33 | ... | 0 |
| 0.33 | ... | 0 |
| 0.75 | ... | 1 |
| 0.75 | ... | 0 |
| 0.75 | ... | 1 |
| 0.75 | ... | 1 |
| 1.00 | ... | 1 |

Fig.3

CODE BEFORE CONVERSION

6

```
tbl['Category_TgtMean'] = tbl.groupby(['Category'])['Target'].transform('mean')
```

CODE BEFORE CONVERSION

7

```
tbl['ABCD_TgtMean'] = tbl.groupby(['CatA','CatB','CatC','CatD'])['Target'].transform('mean')
tbl['BCDE_TgtMean'] = tbl.groupby(['CatB','CatC','CatD','CatE'])['Target'].transform('mean')
```

Fig.5

CODE BEFORE CONVERSION

7

```
tbl['ABCD_TgtMean'] = tbl.groupby(['CatA','CatB','CatC','CatD'])['Target'].transform('mean')
tbl['BCDE_TgtMean'] = tbl.groupby(['CatB','CatC','CatD','CatE'])['Target'].transform('mean')
```

CODE AFTER CONVERSION

8

```
grp_t0 = groupby(['CatB', 'CatC', 'CatD'])
tbl['grp_t0 '] = grp_t0.getid()
```

9

```
tbl['ABCD_TgtMean'] = tbl.groupby(['CatA','grp_t0'])['Target'].transform('mean')
tbl['BCDE_TgtMean'] = tbl.groupby(['grp_t0','CatE'])['Target'].transform('mean')
```

```
grp0 = table.groupby(['A', 'B'])
grp1 = table.groupby(['A', 'C'])
grp2 = table.groupby(['A', 'B', 'D'])
grp3 = table.groupby(['A', 'B', 'D', 'E', 'F'])
grp4 = table.groupby(['A', 'B', 'E', 'F', 'G'])
grp5 = table.groupby(['A', 'B', 'E', 'F', 'H'])
grp6 = table.groupby(['A', 'B', 'E', 'F', 'I'])

#   There is also a aggregation operation for group, which is omitted to save space
```

72

```
0 : ['A','B']
1 : ['A','C']
2 : ['A','B','D']
3 : ['A','B','D','E','F']
4 : ['A','B','E','F','G']
5 : ['A','B','E','F','H']
6 : ['A','B','E','F','I']
```

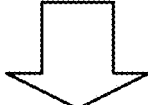

Fig.8
81
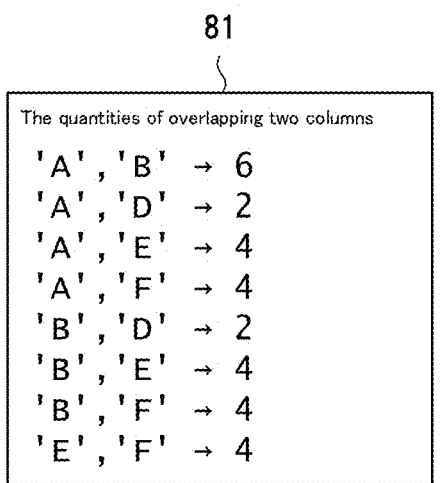
```
The quantities of overlapping two columns
'A','B' → 6
'A','D' → 2
'A','E' → 4
'A','F' → 4
'B','D' → 2
'B','E' → 4
'B','F' → 4
'E','F' → 4
```
82
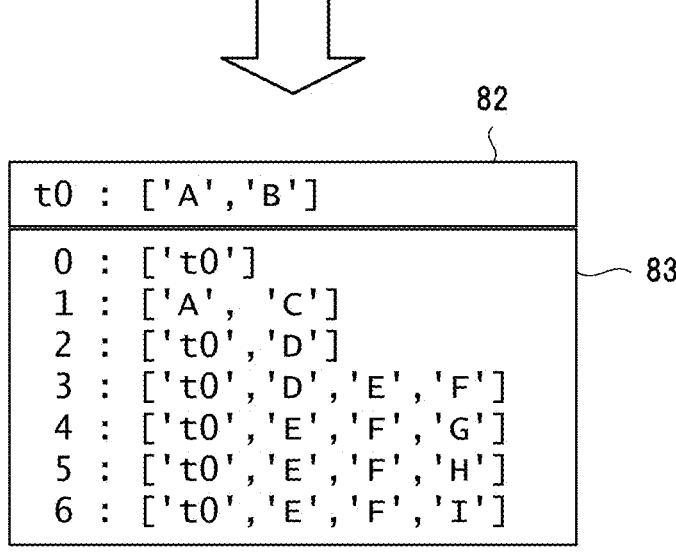
```
t0 : ['A','B']
0 : ['t0']
1 : ['A', 'C']
2 : ['t0','D']
3 : ['t0','D','E','F']
4 : ['t0','E','F','G']
5 : ['t0','E','F','H']
6 : ['t0','E','F','I']
```
83

Fig.9
91
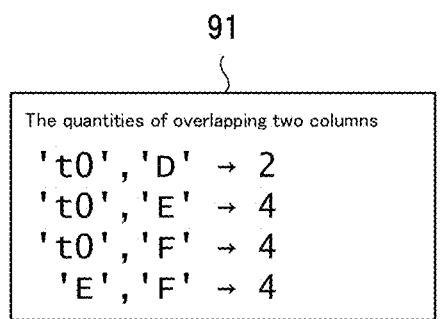
The quantities of overlapping two columns
'tO','D' → 2
'tO','E' → 4
'tO','F' → 4
'E','F' → 4
92
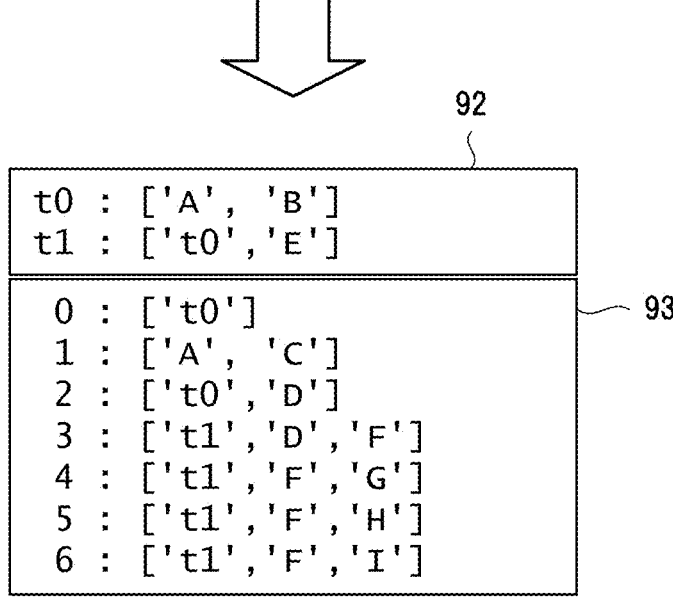
tO : ['A', 'B']
t1 : ['tO','E']
0 : ['tO']
1 : ['A', 'C']
2 : ['tO','D']
3 : ['t1','D','F']
4 : ['t1','F','G']
5 : ['t1','F','H']
6 : ['t1','F','I']
93

```
#  The second function codes and the third function codes
grp_t0 = table.groupby(['A','B'])
table['t0'] = grp_t0.getid()
grp_t2 = table.groupby(['t0','E','F'])
table['t2'] = grp_t2.getid()

#  Replacement of key-column names in the first function codes
grp0 = grp_t0
grp1 = table.groupby(['A', 'C'])
grp2 = table.groupby(['t0', 'D'])
grp3 = table.groupby(['t2', 'D'])
grp4 = table.groupby(['t2', 'G'])
grp5 = table.groupby(['t2', 'H'])
grp6 = table.groupby(['t2', 'I'])

There is also a aggregation operation for group, which is omitted to save space

#  Remove duplicate groups temporarily added from the table
#  It is not essential because it is to be in the same state as the original group key list
del table['t0']
del table['t1']
```

CODE CONVERSION APPARATUS, CODE CONVERSION METHOD, AND COMPUTER READABLE RECORDING MEDIUM

This application is a National Stage Entry of PCT/JP2021/048647 filed on Dec. 27, 2021, the contents of all of which are incorporated herein by reference, in their entirety.

TECHNICAL FIELD

The technical field relates to a code conversion apparatus and a code conversion method for conversion into codes, and further relates to a computer readable recording medium that includes recorded thereon a program for realizing the code conversion apparatus and the code conversion method.

BACKGROUND ART

Preprocessing for generating training data to be used for machine learning includes feature-amount generation processing. Furthermore, it is known that feature-amount generation processing is time-consuming.

Thus, there is a demand to reduce the time required for feature-amount generation processing. The reason why feature-amount generation processing is time-consuming is because a plurality of columns included in two-dimensional array data are set as key columns, and a grouping operation is performed for each combination of key columns. Specifically, the reason is that, if there are columns that are same among key columns, same processing would be executed.

As related techniques, Patent Documents 1 and 2 disclose techniques in which a combination of a plurality of key columns included in two-dimensional array data is changed, and an operation using key columns is executed for each combination.

LIST OF RELATED ART DOCUMENTS

Patent Document
Patent Document 1: Japanese Patent Laid-Open Publication No. 2014-228974
Patent Document 2: Japanese Patent Laid-Open Publication No. 2012-504825

SUMMARY OF INVENTION

Problems to be Solved by the Invention

However, the techniques disclosed in Patent Documents 1 and 2 are not for converting grouping-operation codes to be used in feature-amount generation processing or the like into codes for increasing speed (reducing operation time).

As one aspect, an example object is to provide a code conversion apparatus, a code conversion method, and a computer readable recording medium that increase the speed (reduce the operation time) of a grouping operation using a plurality of key columns included in two-dimensional array data.

Means for Solving the Problems

In order to achieve the example object described above, a code conversion apparatus according to an example aspect includes:

a function-detecting unit that, from codes to be executed by a computer that are stored in advance in a storage device, detecting first function codes for combining a plurality of key columns included in two-dimensional array data and executing a grouping operation for each combination of key columns;

a group-key-generating unit that, for each of the detected first function codes, detecting key-column names indicating names of the key columns from the first function code, and using the key-column names to generate a group key for each piece of the two-dimensional array data of the first function code;

an overlap group-generating unit that detects key-column names that are same among a plurality of the group keys and generating an overlap group formed from the detected overlap key-column names;

a function-code-adding unit that uses an overlap group name indicating the name of the overlap group and the key-column names forming the overlap group to add a second function code for executing the grouping operation and a third function code for adding the overlap group name indicating the name of the overlap group to the two-dimensional array data as a key column; and a key-column-replacing unit that replaces key-column names included in the first function codes that have been used in the overlap group with the overlap group name.

Also, in order to achieve the example object described above, a code conversion method that is performed by a computer according to an example aspect includes:

a function-detecting step of, from codes to be executed by a computer that are stored in advance in a storage device, detecting first function codes for combining a plurality of key columns included in two-dimensional array data and executing a grouping operation for each combination of key columns;

a group-key-generating step of, for each of the detected first function codes, detecting key-column names indicating names of the key columns from the first function code, and generating a group key using the key-column names for each piece of the two-dimensional array data of the first function code;

an overlap group-generating step of detecting key-column names that are same among a plurality of the group keys and generating an overlap group formed from the detected overlap key-column names;

a function-code-adding step of adding a second function code for executing the grouping operation and a third function code for adding the overlap group name indicating the name of the overlap group to the two-dimensional array data as a key column by using an overlap group name indicating the name of the overlap group and the key-column names forming the overlap group; and a key-column-replacing step of replacing key-column names included in the first function codes that have been used in the overlap group with the overlap group name.

Furthermore, in order to achieve the example object described above, a computer-readable recording medium according to an example aspect includes a program recorded on the computer-readable recording medium, the program including instructions that cause the computer to carry out:

a function-detecting step of, from codes to be executed by a computer that are stored in advance in a storage device, detecting first function codes for combining a plurality of key columns included in two-dimensional array data and executing a grouping operation for each combination of key columns;

a group-key-generating step of, for each of the detected first function codes, detecting key-column names indicating names of the key columns from the first function code, and generating a group key using the key-column names for each piece of the two-dimensional array data of the first function code;

an overlap group-generating step of detecting key-column names that are same among a plurality of the group keys and generating an overlap group formed from the detected overlap key-column names;

a function-code-adding step of adding a second function code for executing the grouping operation and a third function code for adding the overlap group name indicating the name of the overlap group to the two-dimensional array data as a key column by using an overlap group name indicating the name of the overlap group and the key-column names forming the overlap group; and a key-column-replacing step of replacing key-column names included in the first function codes that have been used in the overlap group with the overlap group name.

Advantageous Effects of the Invention

As one aspect, a grouping operation using a plurality of key columns included in two-dimensional array data can be increased the speed (operation time can be increased).

BRIEF DESCRIPTION OF THE DRAWINGS

FIG. 1 is a diagram for describing target encoding.

FIG. 3 is a diagram for describing codes for target encoding.

FIG. 5 is a diagram for describing an example of code conversion.

FIG. 7 is a diagram for describing code conversion.

FIG. 8 is a diagram for describing code conversion.

FIG. 9 is a diagram for describing code conversion.

FIG. 11 is a diagram for describing code conversion.

EXAMPLE EMBODIMENT

First, an overview will be provided in order to facilitate understanding of the later-described example embodiment.

Preprocessing for generating training data to be used for machine learning includes feature-amount generation processing. For example, as feature-amount generation processing, target encoding (also called target mean encoding (likelihood encoding)), in which categorical variables are converted into numerical values (feature amounts) is known. Target encoding is processing in which objective variables are aggregated for each categorical variable and conversion into a numerical value is performed using the aggregated value (for example, a mean value, a variance value, or the like).

FIG. 1 is a diagram for describing target encoding. In a case in which table 1 as shown in FIG. 1 is to be used as input for machine learning, table 1 cannot be used directly as input for machine learning because the data items in the "Category" column in table 1 are not numerical values.

Thus, by using target encoding, the data items in the "Category" column in table 1 as shown in FIG. 1 are converted into numerical values obtained by aggregating objective variables, as exemplified by the data items shown in the "Category Tgt-Mean" column in table 3.

In this case, first, the data items in the "Category" column in table 1 (i.e., categorical variables A, B, C, and D) are each set to information that does not have any meaning in the numerical value itself, such as an integer value for example, as exemplified by the data items shown in the "Category ID" column in table 2. In the example in FIG. 1, the values 1, 2, 3, and 4 are respectively set to the categorical variables A, B, C, and D.

Next, using the data items in the "Category ID" column in table 2, a mean value is calculated for each categorical variable, as exemplified by the data items shown in the "Category Tgt-Mean" column in table 3. In the example in FIG. 1, the categorical variables A, B, C, and D are respectively converted into the numerical values 0.50 (=(1+0)/2), 0.33 (=(1+0+0)/3), 0.75 (=(1+0+1+1)/4), and 1.00 (=(1)/1).

Figure 2:
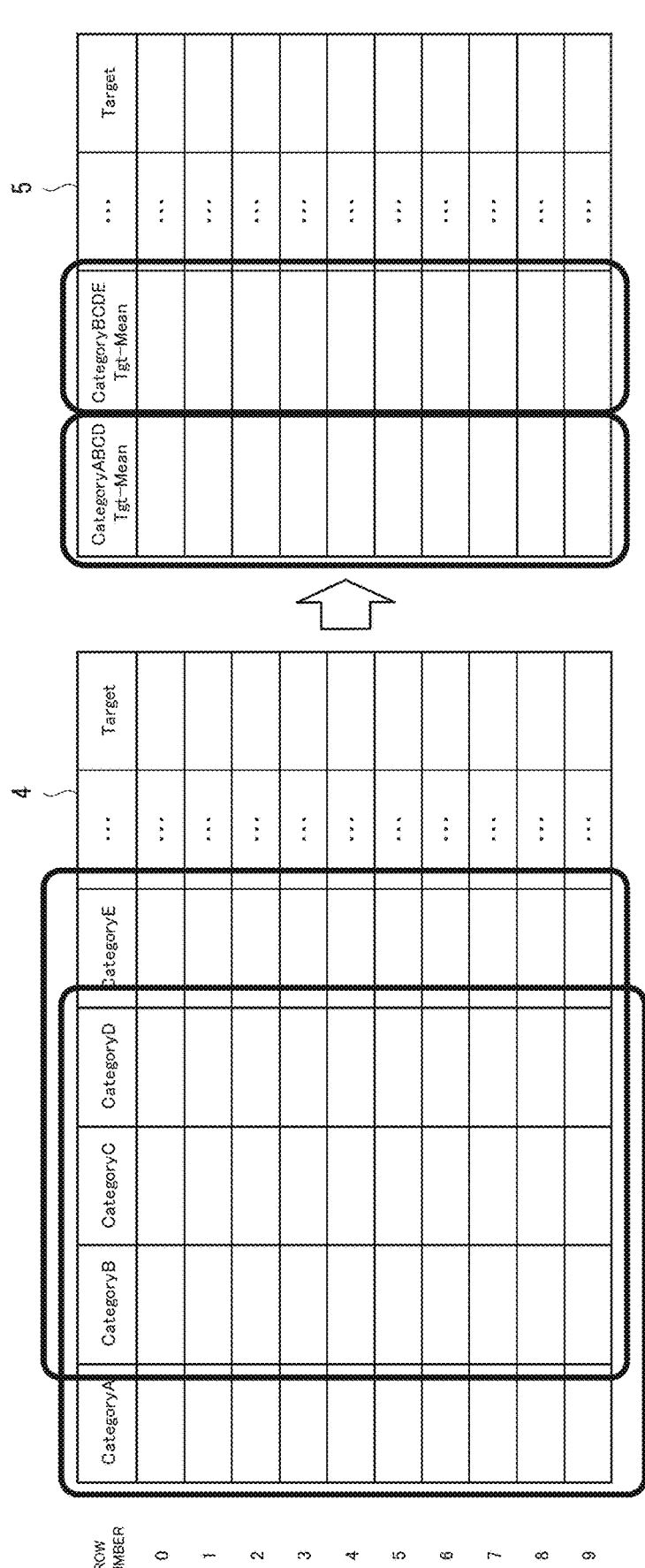
FIG. 2 is a diagram for describing target encoding expanded to a plurality of categorical variables.

Next, with reference to FIG. 2, a case will be described in which target encoding is performed using combinations of a plurality of categorical variables, in addition to using one categorical variable. FIG. 2 is a diagram for describing target encoding expanded to a plurality of categorical variables.

In the example in FIG. 2, target encoding is performed using four categorical variables among the categorical variables "CategoryA", "CategoryB", "CategoryC", "CategoryD", and "CategoryE" shown in table 4. Note that, in the example in FIG. 2, the data items in each column are omitted for convenience.

In the example in FIG. 2, target encoding using the categorical variables "CategoryA", "CategoryB", "CategoryC", and "CategoryD", and target encoding using the categorical variables "CategoryB", "CategoryC", "CategoryD", and "CategoryE" are executed.

As a result, the categorical variables "CategoryABCD Tgt-Mean" and "CategoryBCDE Tgt-Mean" in table 5 shown in FIG. 2 are generated.

Target encoding using a table processing library will be described. FIG. 3 is a diagram for describing codes for target encoding. The code shown in FIG. 3 is an example of a code in which are used the "groupby" and "transform" functions in pandas, which is a table processing library for the Python language.

The code 6 in FIG. 3 is a code for target encoding using one categorical variable described with reference to FIG. 1. The codes 7 in FIG. 3 are codes for target encoding using a plurality of categorical variables described with reference to FIG. 2.

The "groupby" function used in codes 6 and 7 is a function (or method) for grouping. The "transform" function is a function (or method) for rewriting data using acquired statistical information (for example, mean values, variance values, or the like).

The descriptions "Category", "CatA", "CatB", "CatC", "CatD", and "CatE" in the codes 6 and 7 represent the columns "Category", "CategoryA", "CategoryB", "CategoryC", "CategoryD", and "CategoryE" shown in FIGS. 1 and 2. "Target" represents "Target" shown in FIGS. 1 and 2. "Category_TgtMean", "ABCD_TgtMean", and "BCDE_TgtMean" represent "Category Tgt-Mean", "Category-ABCD Tgt-Mean", and "CategoryBCDE Tgt-Mean" shown in FIGS. 1 and 2.

Processing executed based on the codes 6 and 7 includes processing of generating groups, and processing of calculating an aggregated value for each group. In the case of the code 6, groups GRP0, GRP1, GRP2, and GRP3 as shown below are generated for the respective categorical variables as a result of the processing of generating groups.

Note that the numerical values representing elements included in the groups GRP0 to GRP3 shown below are based on the row numbers shown in FIG. 1.

| | |
|---|---|
| GRP0: 0, 1 | (group of CategoryA) |
| GRP1: 2, 3, 4 | (group of CategoryB) |
| GRP2: 5, 6, 7, 8 | (group of CategoryC) |
| GRP3: 9 | (group of CategoryD) |

Furthermore, in the case of the code 6, by calculating an aggregated value for each group, mean values of the respective groups as shown below are calculated.

| | |
|---|---|
| Mean value (0.50) of GRP0: 0, 1 | (A in Category Tgt-Mean) |
| Mean value (0.33) of GRP1: 2, 3, 4 | (B in Category Tgt-Mean) |
| Mean value (0.75) of GRP2: 5, 6, 7, 8 | (C in Category Tgt-Mean) |
| Mean value (1.00) of GRP3: 9 | (D in Category Tgt-Mean) |

However, in a case such as when "groupby" using a plurality of columns (key columns) is executed multiple times while changing the combinations of key columns, same processing (similar, unnecessary processing) would be executed if there are columns that are same among the key columns.

Specifically, if "groupby" is executed twice using the two combinations of the categorical variables "CategoryA", "CategoryB", "CategoryC", and "CategoryD" and the categorical variables "CategoryB", "CategoryC", "CategoryD", and "CategoryE as shown in the codes 7, same processing (similar, unnecessary processing) would be executed because the categorical variables "CategoryB", "CategoryC", and "CategoryD" are included in both of the two combinations.

Accordingly, the operation speed of feature-amount generation processing decreases (operation time increases) by an amount corresponding to the amount of time consumed to execute unnecessary processing. Furthermore, the operation amount increases as the number of key columns increases.

Through such a process, the inventor found a problem to be solved with a method as described above that the operation speed of feature-amount generation processing is to be increased (operation time is to be reduced), and also arrived at a means for solving the problem.

That is, the inventor arrived at a means for converting codes to be used to execute a grouping operation using a plurality of key columns included in two-dimensional array data (table) into codes with which operation speed can be increased (operation time can be reduced). Thus, the operation speed of feature-amount generation processing can be increased (operation time can be reduced).

In the following, an example embodiment will be described with reference to the drawings. Note that, in the drawings described in the following, the same reference symbol is provided to elements having the same function or corresponding functions, and repetitive description thereof may be omitted.

Example Embodiment

Figure 4:
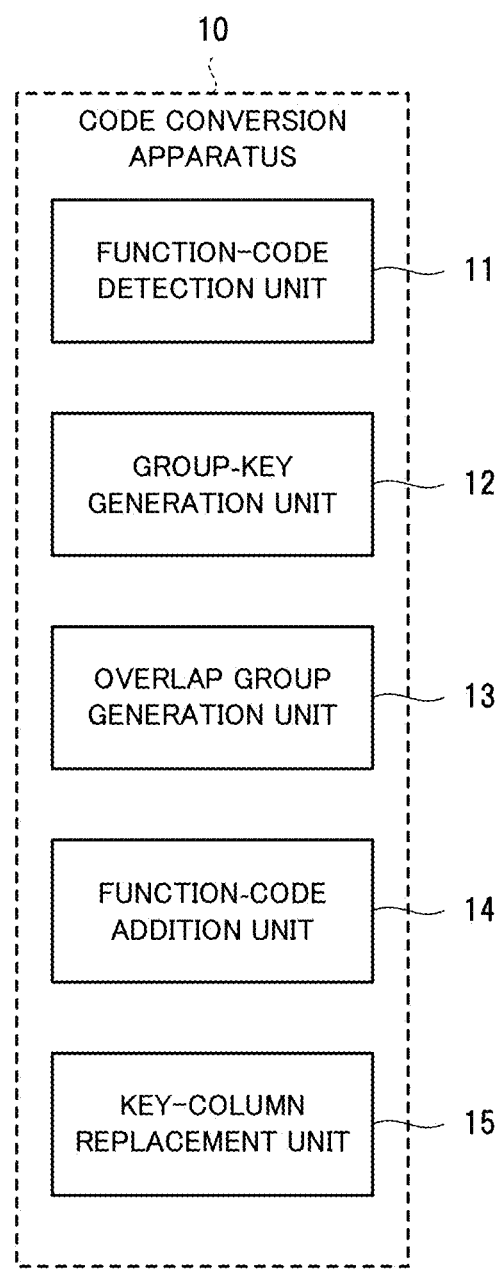
FIG. 4 is a diagram for describing an example of a code conversion apparatus.

A configuration of a code conversion apparatus 10 in the example embodiment will be described with reference to FIG. 4. FIG. 4 is a diagram for describing an example of a code conversion apparatus.

[Apparatus Configuration]

The code conversion apparatus 10 illustrated in FIG. 4 is an apparatus that generates codes for increasing operation speed (reducing operation time) based on codes to be used to execute a grouping operation using a plurality of key columns included in two-dimensional array data (table).

For example, the code conversion apparatus 10 generates codes for increasing operation speed (reducing operation time) if codes to be executed by a computer include description of functions for executing a grouping operation using a plurality of key columns included in two-dimensional array data.

The code conversion apparatus 10 includes a function-code detection unit 11, a group-key generation unit 12, an overlap group generation unit 13, a function-code addition unit 14, and a key-column replacement unit 15.

From codes to be executed by a computer that are stored in advance in a storage device, the function-code detection unit 11 detects first function codes for combining a plurality of key columns included in two-dimensional array data (table) and executing a grouping operation for each combination of key columns.

Specifically, the function-code detection unit 11 detects "groupby" functions (first function codes), for example, from codes to be executed by a computer.

FIG. 5 is a diagram for describing an example of code conversion. For example, from codes to be executed by a computer, the function-code detection unit 11 detects codes 7 shown in FIG. 5 (codes 7 in FIG. 3) or the like.

For each of the detected first function codes, the group-key generation unit 12 detects key-column names indicating names of key columns from the first function code, and generates a group key (group-key list) for each piece of two-dimensional array data (table) of the first function code using the key-column names.

For example, in the case of the upper one of the codes 7, the group-key generation unit 12 detects the key-column names "CatA", "CatB", "CatC", and "CatD" included in the "groupby" function, and generates a group key (0: CatA, CatB, CatC, CatD) using the detected key-column names "CatA", "CatB", "CatC", and "CatD".

Furthermore, for example, in the case of the lower one of the codes 7, the group-key generation unit 12 detects the key-column names "CatB", "CatC", "CatD", and "CatE" from the table, and generates a group key (1: CatB, CatC, CatD, CatE) using the detected key-column names "CatB", "CatC", "CatD", and "CatE".

The overlap group generation unit 13 detects key-column names that are same among a plurality of the group keys (group-key list), and generates an overlap group formed from the detected overlap key-column names.

For example, the overlap group generation unit 13 generates an overlap group (t0: CatB, CatC, CatD) using an overlap group name (t0) indicating the name of the overlap group and the overlap key-column names ("CatB", "CatC", and "CatD").

The function-code addition unit 14 adds a second function code for executing the grouping operation and a third function code for adding the overlap group name indicating the name of the overlap group to the two-dimensional array data (table) as a key column using the overlap group name indicating the name of the overlap group and the key-column names forming the overlap group.

For example, the function-code addition unit 14 adds codes 8 above the codes 7 as shown in FIG. 5. Specifically, the second function code (upper one of the codes 8) and the third function code (lower one of the codes 8) are added above the codes 7.

Note that lower one of the codes 8 is a function (or method) that is not included in pandas, which is a table processing library of the Python language.

The key-column replacement unit 15 replaces key-column names included in the first function codes that have been used in the overlap group with the overlap group name.

Specifically, the key-column replacement unit 15 replaces key-column names included in the "groupby" functions (first function codes) that have been used in the overlap group with the overlap group name of the overlap group formed from the overlap key columns. For example, the key-column replacement unit 15 performs conversion as indicated by codes 9 in FIG. 5.

In such a manner, in the example embodiment, codes to be used to execute a grouping operation using a plurality of key columns included in two-dimensional array data (table) are converted into codes with which operation speed can be increased (operation time can be reduced). Thus, the operation speed of feature-amount generation processing can be increased (operation time can be reduced).

[System Configuration]

Figure 6:
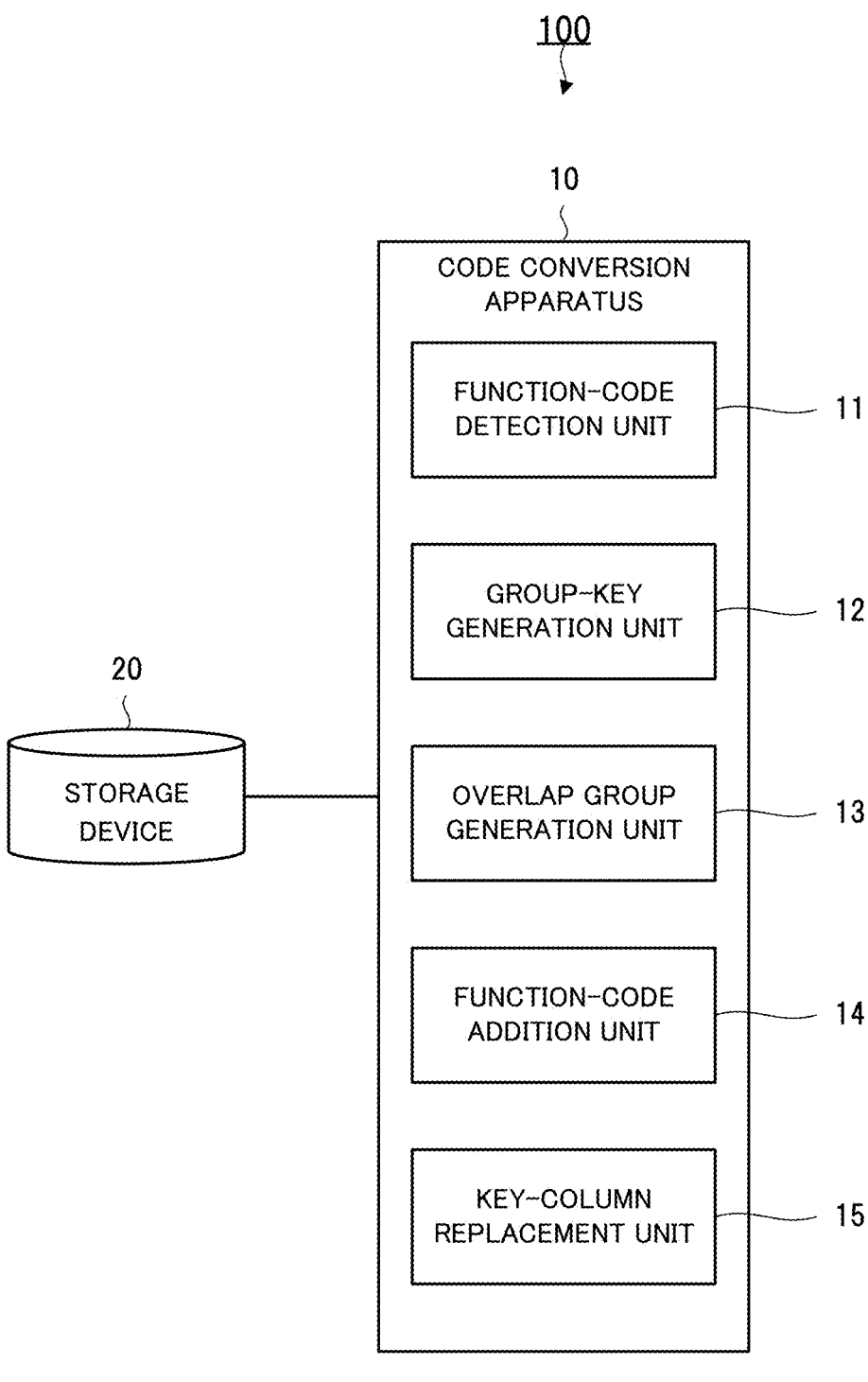
FIG. 6 is a diagram for describing an example of a system including the code conversion apparatus.

The configuration of the code conversion apparatus 10 in the example embodiment will be described in detail with reference to FIG. 6. FIG. 6 is a diagram for describing an example of a system including the code conversion apparatus 10. In the example in FIG. 6, a system 100 includes the code conversion apparatus 10 and a storage device 20.

For example, the code conversion apparatus 10 is an information processing apparatus such as a central processing unit (CPU), a programmable device such as a field-programmable gate array (FPGA), a graphics processing unit (GPU), or a circuit, a server computer, a personal computer, or a mobile terminal having at least one of a CPU, a programmable device, and a GPU installed therein.

The storage device 20 has stored therein computer executable codes (codes before conversion) to be used to generate training data. Furthermore, codes (codes after conversion) with which operation speed can be increased (operation time can be reduced) are stored to the storage device 20.

The code conversion apparatus will be described in detail.

Processing for code conversion will be described in detail with reference to codes in which are used the "groupby" and "transform" functions in pandas, which is a table processing library of the Python language. However, the code description language is not limited to the Python language.

FIGS. 7, 8, 9, 10, and 11 are diagrams for describing code conversion. A case will be described in which, from codes to be executed by a computer, the function-code detection unit 11 has detected the codes 71 shown in FIG. 7. Note that, in FIGS. 7 to 11 referred to in the following, description of "Aggregation", "transform", or the like to be performed on "group" is omitted in order to facilitate understanding of the explanation.

Next, if the codes 71 shown in FIG. 7 have been detected, the group-key generation unit 12 generates the group-key list 72 shown in FIG. 7, which is formed from a plurality of group keys.

Next, the overlap group generation unit 13 detects pairs of key columns that overlap from the group-key list 72 in FIG. 7, and further calculates the quantities of the pairs of overlapping key columns that are detected. As a result, the quantity of each pair of overlapping key columns is calculated as shown in 81 in FIG. 8.

Next, the overlap group generation unit 13 compares the quantities of the pairs of overlapping key columns, and selects the pair of overlapping key columns having the greatest quantity. In the example in 81 in FIG. 8, the pair of overlapping key columns "A" and "B" has the greatest quantity (six), and thus the pair of overlapping key columns "A" and "B" is selected.

Next, the overlap group generation unit 13 generates the overlap group 82 (t0: ['A', 'B']) shown in FIG. 8 using the pair of overlapping key columns "A" and "B" that has been selected.

Furthermore, the overlap group generation unit 13 replaces the pair of overlapping key columns "A" and "B" in the group-key list 72 in FIG. 7 with "t0" indicating the name of the overlap group, and generates the new group-key list 83 shown in FIG. 8.

Next, the overlap group generation unit 13 detects pairs of overlapping key columns from the group-key list 83 in FIG. 8, and further calculates the quantities of the detected pairs of overlapping key columns. As a result, the quantity of each pair of overlapping key columns is calculated as shown in 91 in FIG. 9.

Next, the overlap group generation unit 13 compares the quantities of the pairs of overlapping key columns, and selects the pair of overlapping key columns having the greatest quantity. In the example in 91 in FIG. 9, the pairs of overlapping key columns "0" and "D", "t0" and "E", "t0" and "F", and "E" and "F" have the greatest quantity of four, and thus one pair of overlapping key columns "t0" and "E" is selected from among these pairs of overlapping key columns. However, one of the pairs of overlapping key columns "t0" and "D", "t0" and "F", and "E" and "F" may be selected as the pair of overlapping key columns that is selected.

Next, the overlap group generation unit 13 generates the overlap groups 92 shown in FIG. 9 (adds t1: ['t0', 'E'] to the overlap group 82) using the pair of overlapping key columns "t0" and "E" that has been selected.

Furthermore, the overlap group generation unit 13 replaces the pair of overlapping key columns "t0" and "E" in the group-key list 83 in FIG. 8 with "t1" indicating the name of the overlap group, and generates the new group-key list 93 shown in FIG. 9.

Next, the overlap group generation unit 13 detects pairs of overlapping key columns from the group-key list 93 in FIG. 9, and further calculates the quantities of the detected pairs of overlapping key columns. As a result, the quantity of each pair of overlapping key columns is calculated as shown in 101 in FIG. 10.

Next, the overlap group generation unit 13 compares the quantities of the pairs of overlapping key columns, and selects the pair of overlapping key columns having the greatest quantity. In the example in 101 in FIG. 10, only the pair of overlapping key columns "t1" and "F" is present (the pair of overlapping key columns has the greatest quantity (four)), and thus the pair of overlapping key columns "t1" and "F" would be selected.

Figure 10:
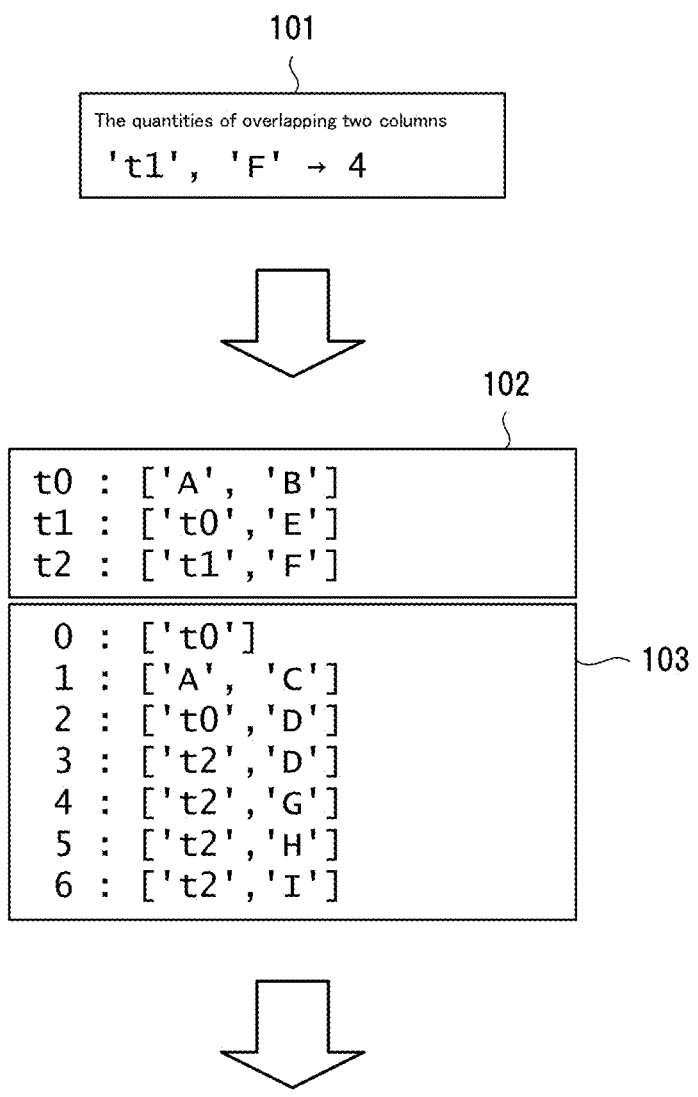
FIG. 10 is a diagram for describing code conversion.

Next, the overlap group generation unit 13 generates the overlap groups 102 shown in FIG. 10 (adds t2: ['t1', 'F'] to the overlap groups 92) using the pair of overlapping key columns "t1" and "F" that has been selected. Furthermore, the overlap group generation unit 13 replaces the pair of overlapping key columns "t1" and "F" in the group-key list 93 in FIG. 9 with "t2" indicating the name of the overlap group, and generates the new group-key list 103 shown in FIG. 9.-10.

In such a manner, the overlap group generation unit 13 eliminates key-column names that are included in two group keys, in a plurality of group keys.

Next, after generating the group-key list 103 without any key columns that are included in two group keys, the overlap group generation unit 13 converts the overlap groups 102 shown in FIG. 10 into the overlap groups 104 shown in FIG. 11.

Specifically, among "t0: ['A', 'B']", "t1: ['t0', 'E']", and "t2: ['t1', 'F']" in the overlap groups 102 shown in FIG. 10, "t1: ['t0','E']", which is not included in the group-key list 103, is eliminated and expanded in "t2: ['t1', 'F']" to obtain "t2: ['t0', 'E', 'F']" shown in FIG. 11.

While "t0" and "t2" are used in the group-key list 103 of "0" to "6" corresponding to "groupby" of the (original) group-key list 72, "t1" is not used. That is, "t1" has been created to eliminate overlapping and does not serve as a key for "groupby" of the group-key list 72, and thus is deleted. However, "t2" is used; thus, "t1" is deleted after being expanded in "t2".

Next, the function-code addition unit 14 generates second function codes and third function codes based on the group-key list 105, and adds the second function codes and the third function codes as shown in 106 in FIG. 11.

Specifically, the second function code "grp_t0=table.groupby(['A', 'B'])" and the third function code "table['t0']=grp_t0.getid( )" corresponding to "t0" are added. Also, the second function code "grp_t2=table.groupby(['t0', 'E', 'F'])" and the third function code "table['t2']=grp_t2.getid( )" corresponding to "t2" are added.

Next, based on the group-key list 105, the key-column replacement unit 15 replaces the combination of "A", "B" and the combination of "A", "B", "E", and "F" included in the first function codes ("groupby" functions) in the codes shown in FIG. 7 with the overlap group names "t0" and "t2", respectively, to obtain the codes shown in 106 in FIG. 11 (replacement of key-column names in the first function codes).

In such a manner, in the example embodiment, codes to be used to execute a grouping operation using a plurality of key columns included in two-dimensional array data (table) are converted into codes with which operation speed can be increased (operation time can be reduced). Thus, the operation speed of feature-amount generation processing can be increased (operation time can be reduced).

[Apparatus Operations]

Figure 12:
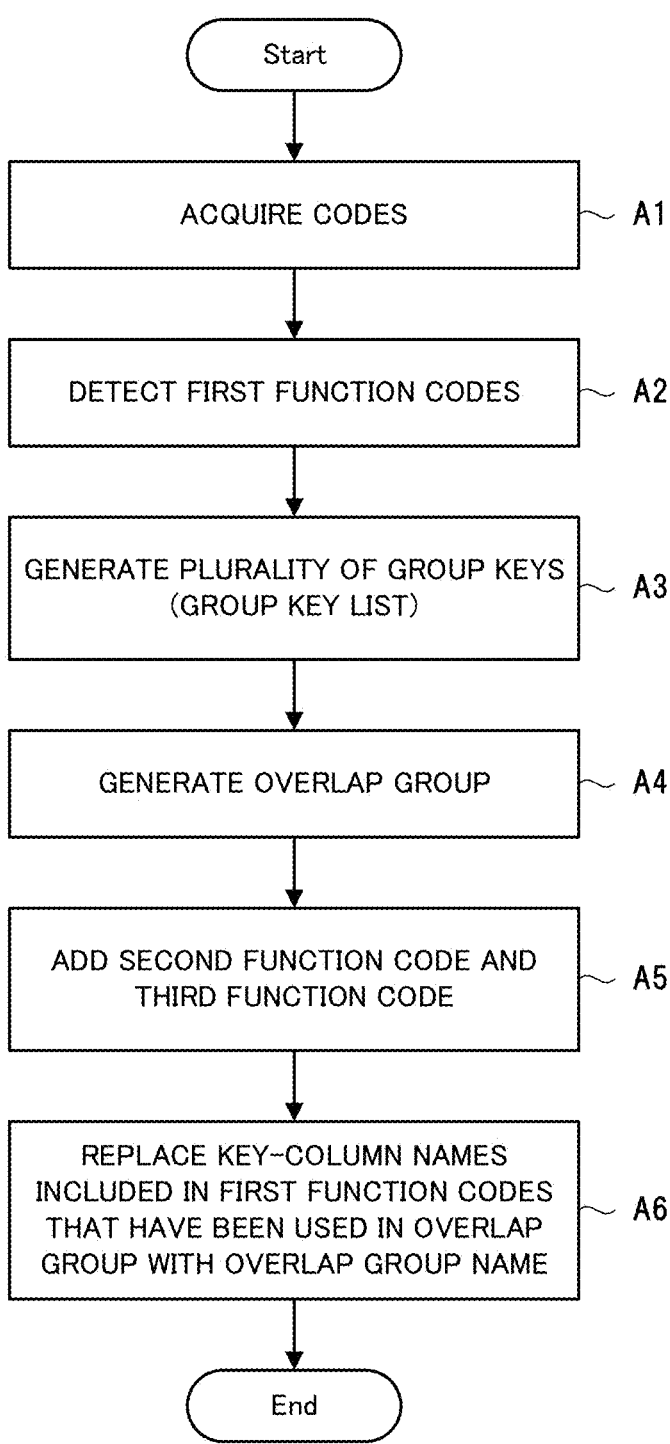
FIG. 12 is a diagram for describing an example of operations of the code conversion apparatus.

Next, operations of the code conversion apparatus in the example embodiment will be described with reference to FIG. 12. FIG. 12 is a diagram for describing an example of operations of the code conversion apparatus. Drawings will be referred to as needed in the following description. Furthermore, in the example embodiment, a code conversion method is implemented by causing the code conversion apparatus to operate. Accordingly, the following description of the operations performed by the code conversion apparatus is substituted for the description of the code conversion method in the example embodiment.

As illustrated in FIG. 12, first, the function-code detection unit 11 acquires codes to be executed by a computer that are stored in advance in a storage device (step A1). Next, from the acquired codes, the function-code detection unit 11 detects first function codes for combining a plurality of key columns included in two-dimensional array data (table) and executing a grouping operation for each combination of key columns (step A2).

For each of the detected first function codes, the group-key generation unit 12 detects key-column names indicating names of the key columns from the first function code, and generates a group key (group-key list) for each piece of two-dimensional array data (table) of the first function code using the key-column names (step A3).

Next, the overlap group generation unit 13 detects key-column names that are same among a plurality of the group keys (group-key list), and generates an overlap group formed from the detected overlap key-column names (step A4).

Specifically, in step A4, first, the overlap group generation unit 13, in each of the group keys, combines two of the key-column names included in the group key, sets the combination that appears most frequently as the overlap group, and further replaces the two key-column names included in the group key that are used in the overlap group with the overlap group name. Next, the overlap group generation unit 13 eliminates the key-column names that are included in two group keys, in a plurality of group keys (group-key list).

Next, the function-code addition unit 14 adds a second function code for executing the grouping operation and a third function code for adding the overlap group name indicating the name of the overlap group to the two-dimensional array data (table) as a key column using an overlap group name indicating the name of the overlap group and the key-column names forming the overlap group (step A5).

The key-column replacement unit 15 replaces key-column names included in the first function codes that have been used in the overlap group with the overlap group name (step A6).

Effects of Embodiment

As described above, according to the example embodiment, codes to be used to execute a grouping operation using a plurality of key columns included in two-dimensional array data (table) can be converted into codes with which operation speed can be increased (operation time can be increased). Thus, the operation speed of feature-amount generation processing can be increased (operation time can be reduced).

[Program]

The program according to the embodiment may be a program that causes a computer to execute steps A1 to A6 shown in FIG. 12. By installing this program in a computer and executing the program, the code conversion apparatus and the code conversion method according to the example embodiment can be realized. In this case, the processor of the computer performs processing to function as the function-code detection unit 11, the group-key generation unit 12, the overlap group generation unit 13, the function-code addition unit 14, and the key-column replacement unit 15.

Also, the program according to the embodiment may be executed by a computer system constructed by a plurality of computers. In this case, for example, each computer may function as any of the function-code detection unit 11, the group-key generation unit 12, the overlap group generation unit 13, the function-code addition unit 14, and the key-column replacement unit 15.

[Physical Configuration]

Figure 13:
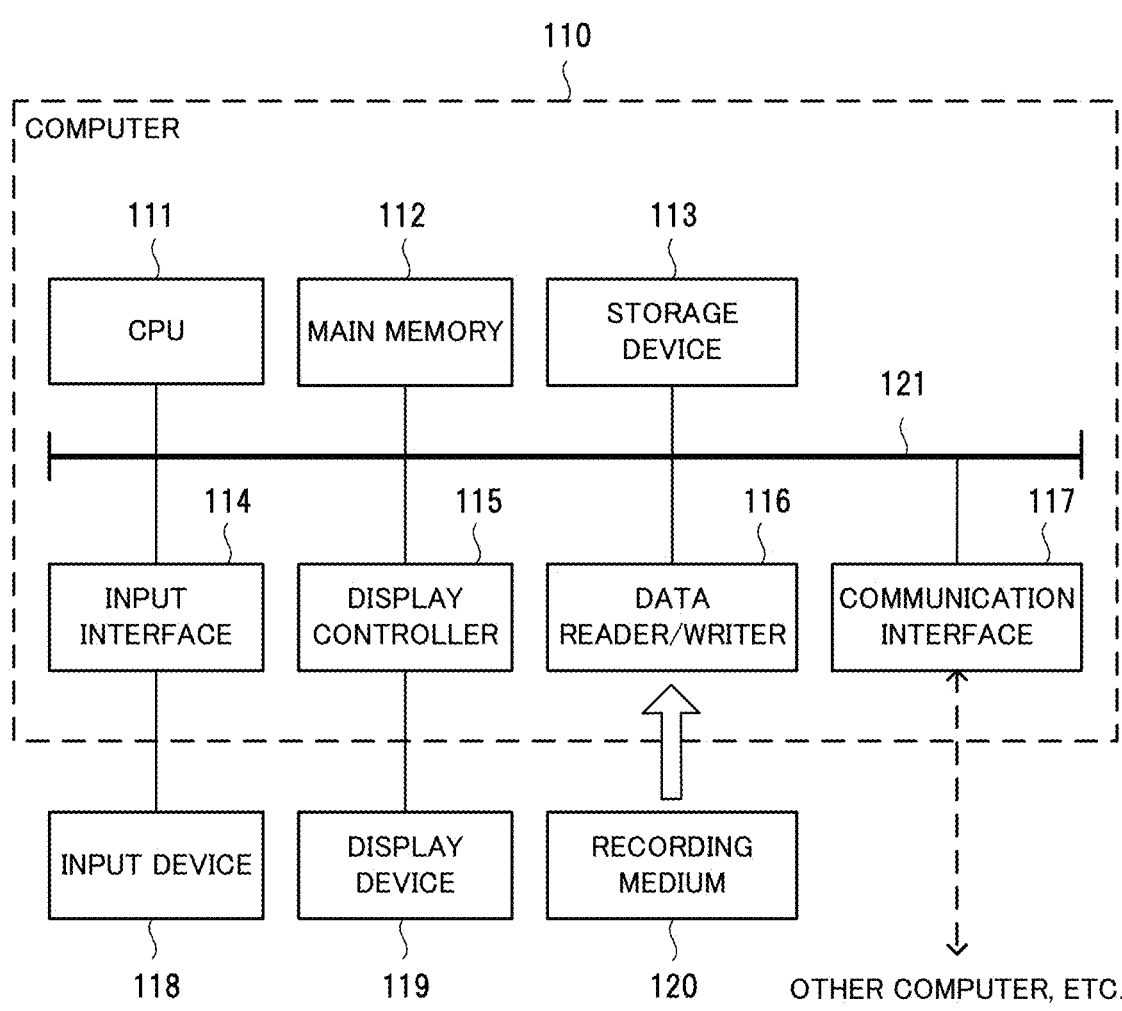
FIG. 13 is a diagram for describing an example of a computer that realizes the code conversion apparatus in the example embodiment.

Here, a computer that realizes a code conversion apparatus by executing the program according to an example embodiment will be described with reference to FIG. 13. FIG. 13 is a diagram for describing an example of a computer that realizes the code conversion apparatus in the example embodiment.

As shown in FIG. 13, a computer 110 includes a CPU (Central Processing Unit) 111, a main memory 112, a storage device 113, an input interface 114, a display controller 115, a data reader/writer 116, and a communications interface 117. These units are each connected so as to be capable of performing data communications with each other through a bus 121. Note that the computer 110 may include a GPU (Graphics Processing Unit) or an FPGA (Field-Programmable Gate Array) in addition to the CPU 111 or in place of the CPU 111.

The CPU 111 opens the program (code) according to this example embodiment, which has been stored in the storage device 113, in the main memory 112 and performs various operations by executing the program in a predetermined order. The main memory 112 is typically a volatile storage device such as a DRAM (Dynamic Random Access Memory). Also, the program according to this example embodiment is provided in a state being stored in a computer-readable recording medium 120. Note that the program according to this example embodiment may be distributed on the Internet, which is connected through the communications interface 117. Note that the computer-readable recording medium 120 is a non-volatile recording medium.

Also, other than a hard disk drive, a semiconductor storage device such as a flash memory can be given as a specific example of the storage device 113. The input interface 114 mediates data transmission between the CPU 111 and an input device 118, which may be a keyboard or mouse. The display controller 115 is connected to a display device 119, and controls display on the display device 119.

The data reader/writer 116 mediates data transmission between the CPU 111 and the recording medium 120, and executes reading of a program from the recording medium 120 and writing of processing results in the computer 110 to the recording medium 120. The communications interface 117 mediates data transmission between the CPU 111 and other computers.

Also, general-purpose semiconductor storage devices such as CF (Compact Flash (registered trademark)) and SD (Secure Digital), a magnetic recording medium such as a Flexible Disk, or an optical recording medium such as a CD-ROM (Compact Disk Read-Only Memory) can be given as specific examples of the recording medium 120.

Also, instead of a computer in which a program is installed, the code conversion apparatus according to this example embodiment can also be realized by using hardware corresponding to each unit. Furthermore, a portion of the code conversion apparatus 10 may be realized by a program, and the remaining portion realized by hardware.

[Supplementary Note]

Furthermore, the following supplementary notes are disclosed regarding the example embodiments described above. Some portion or all of the example embodiments described above can be realized according to (supplementary note 1) to (supplementary note 9) described below, but the below description does not limit the present invention.

(Supplementary Note 1)

A code conversion apparatus comprising:

a function-detecting unit that, from codes to be executed by a computer that are stored in advance in a storage device, detects first function codes for combining a plurality of key columns included in two-dimensional array data and executing a grouping operation for each combination of key columns;

a group-key-generating unit that, for each of the detected first function codes, detects key-column names indicating names of the key columns from the first function code, and generates a group key using the key-column names for each piece of the two-dimensional array data of the first function code;

an overlap group-generating unit that detects key-column names that are same among a plurality of the group keys and generates an overlap group formed from the detected overlap key-column names;

a function-code-adding unit that adds a second function code for executing the grouping operation and a third function code for adding the overlap group name indicating the name of the overlap group to the two-dimensional array data as a key column by using an overlap group name indicating the name of the overlap group and the key-column names forming the overlap group;

a key-column-replacing unit that replaces key-column names included in the first function codes that have been used in the overlap group with the overlap group name.

(Supplementary Note 2)

The code conversion apparatus according to Supplementary note 1, wherein the overlap group-generating unit, in each of the group keys, combines two of the key-column names included in the group key, sets the combination that appears most frequently as the overlap group, and further replaces the two key-column names included in the group key that are used in the overlap group with the overlap group name.

(Supplementary Note 3)

The code conversion apparatus according to Supplementary note 2, wherein the overlap group-generating unit eliminates the key-column names in a plurality of the group keys.

(Supplementary Note 4)

A code conversion method that is performed by a computer, comprising:

a function-detecting step of, from codes to be executed by a computer that are stored in advance in a storage device, detecting first function codes for combining a plurality of key columns included in two-dimensional array data and executing a grouping operation for each combination of key columns;

a group-key-generating step of, for each of the detected first function codes, detecting key-column names indicating names of the key columns from the first function code, and generating a group key using the key-column names for each piece of the two-dimensional array data of the first function code;

an overlap group-generating step of detecting key-column names that are same among a plurality of the group keys and generating an overlap group formed from the detected overlap key-column names;

a function-code-adding step of adding a second function code for executing the grouping operation and a third function code for adding the overlap group name indicating the name of the overlap group to the two-dimensional array data as a key column by using an overlap group name indicating the name of the overlap group and the key-column names forming the overlap group; and a key-column-replacing step of replacing key-column names included in the first function codes that have been used in the overlap group with the overlap group name.

(Supplementary Note 5)

The code conversion method according to Supplementary note 4, wherein, in the overlap group-generating step, in each of the group keys, combining two of the key-column names included in the group key, setting the combination that appears most frequently as the overlap group, and further replacing the two key-column names included in the group key that are used in the overlap group with the overlap group name.

(Supplementary Note 6)

The code conversion method according to Supplementary note 5, wherein, in the overlap group-generating step, eliminating the key-column names in a plurality of the group keys.

(Supplementary Note 7)

A computer readable recording medium that includes a program recorded thereon, the program including instructions that cause a computer to carry out:

a function-detecting step of, from codes to be executed by a computer that are stored in advance in a storage device, detecting first function codes for combining a plurality of key columns included in two-dimensional array data and executing a grouping operation for each combination of key columns;

a group-key-generating step of, for each of the detected first function codes, detecting key-column names indicating names of the key columns from the first function code, and generating a group key using the key-column names for each piece of the two-dimensional array data of the first function code;

an overlap group-generating step of detecting key-column names that are same among a plurality of the group keys and generating an overlap group formed from the detected overlap key-column names;

a function-code-adding step of adding a second function code for executing the grouping operation and a third function code for adding the overlap group name indicating the name of the overlap group to the two-dimensional array data as a key column by using an overlap group name indicating the name of the overlap group and the key-column names forming the overlap group; and a key-column-replacing step of replacing key-column names included in the first function codes that have been used in the overlap group with the overlap group name.

(Supplementary Note 8)

The computer readable recording medium according to Supplementary note 7, wherein, in the overlap group-generating step, in each of the group keys, combining two of the key-column names included in the group key, setting the combination that appears most frequently as the overlap group, and further replacing the two key-column names included in the group key that are used in the overlap group with the overlap group name.

(Supplementary Note 9)

The computer readable recording medium according to Supplementary note 8, wherein, in the overlap group-generating step, eliminating the key-column names in a plurality of the group keys.

Although the present invention of this application has been described with reference to exemplary embodiments, the present invention of this application is not limited to the above exemplary embodiments. Within the scope of the present invention of this application, various changes that can be understood by those skilled in the art can be made to the configuration and details of the present invention of this application.

INDUSTRIAL APPLICABILITY

As described above, the grouping operation using a plurality of key columns included in two-dimensional array data (table) can be increased the speed (operation time can be increased). In addition, it is useful in a field where grouping operation using a plurality of key columns included in two-dimensional array data (table) is necessary.

REFERENCE SIGNS LIST

10 Code conversion apparatus
11 Function-code detection unit
12 Group-key generation unit
13 Overlap group generation unit
14 Function-code addition unit
15 Key-column replacement unit
20 Storage device
100 System
110 Computer
111 CPU
112 Main memory
113 Storage device
114 Input interface
115 Display controller
116 Data reader/writer
117 Communications interface
118 Input device
119 Display device
120 Recording medium
121 Bus

What is claimed is:

1. A code conversion apparatus comprising:

at least one memory storing instructions; and at least one processor configured to execute the instructions to:

from codes to be executed by a computer that are stored in advance in a storage device, detect first function codes for combining a plurality of key columns included in two-dimensional array data and executing a grouping operation for each combination of key columns;

for each of the detected first function codes, detect key-column names indicating names of the key columns from the first function code, and generate a group key using the key-column names for each piece of the two-dimensional array data of the first function code;

detect key-column names that are same among a plurality of the group keys and generate an overlap group formed from the detected overlap key-column names;

adds a second function code for executing the grouping operation and a third function code for adding the overlap group name indicating the name of the overlap group to the two-dimensional array data as a key column by using an overlap group name indicating the name of the overlap group and the key-column names forming the overlap group; and replace key-column names included in the first function codes that have been used in the overlap group with the overlap group name.

2. The code conversion apparatus according to claim 1, wherein in the generation of the overlap group, in each of the group keys, combine two of the key-column names included in the group key, set the combination that appears most frequently as the overlap group, and further replace the two key-column names included in the group key that are used in the overlap group with the overlap group name.

3. The code conversion apparatus according to claim 2, wherein in the generation of the overlap group, eliminate the key-column names in a plurality of the group keys.

4. A code conversion method that is performed by a computer:

from codes to be executed by a computer that are stored in advance in a storage device, detecting first function codes for combining a plurality of key columns included in two-dimensional array data and executing a grouping operation for each combination of key columns;

for each of the detected first function codes, detecting key-column names indicating names of the key columns from the first function code, and generating a group key using the key-column names for each piece of the two-dimensional array data of the first function code;

detecting key-column names that are same among a plurality of the group keys and generating an overlap group formed from the detected overlap key-column names;

adding a second function code for executing the grouping operation and a third function code for adding the overlap group name indicating the name of the overlap group to the two-dimensional array data as a key column by using an overlap group name indicating the name of the overlap group and the key-column names forming the overlap group; and replacing key-column names included in the first function codes that have been used in the overlap group with the overlap group name.

5. The code conversion method according to claim 4, wherein, in the generation of the overlap group, in each of the group keys, combining two of the key-column names included in the group key, setting the combination that appears most frequently as the overlap group, and further replacing the two key-column names included in the group key that are used in the overlap group with the overlap group name.

6. The code conversion method according to claim 5, wherein, in the generation of the overlap group, eliminating the key-column names in a plurality of the group keys.

7. A non-transitory computer readable recording medium that includes a program recorded thereon, the program including instructions that cause a computer to carry out:

from codes to be executed by a computer that are stored in advance in a storage device, detecting first function codes for combining a plurality of key columns included in two-dimensional array data and executing a grouping operation for each combination of key columns;

for each of the detected first function codes, detecting key-column names indicating names of the key columns from the first function code, and generating a group key using the key-column names for each piece of the two-dimensional array data of the first function code;

detecting key-column names that are same among a plurality of the group keys and generating an overlap group formed from the detected overlap key-column names;

adding a second function code for executing the grouping operation and a third function code for adding the overlap group name indicating the name of the overlap group to the two-dimensional array data as a key column by using an overlap group name indicating the name of the overlap group and the key-column names forming the overlap group; and replacing key-column names included in the first function codes that have been used in the overlap group with the overlap group name.

8. The non-transitory computer readable recording medium according to claim 7, wherein, in the generation of the overlap group, in each of the group keys, combining two of the key-column names included in the group key, setting the combination that appears most frequently as the overlap group, and further replacing the two key-column names included in the group key that are used in the overlap group with the overlap group name.

9. The non-transitory computer readable recording medium according to claim 8, wherein, in the generation of the overlap group, eliminating the key-column names in a plurality of the group keys.

* * * * *